United States Patent [19]

Prasad et al.

[11] Patent Number: 5,557,951
[45] Date of Patent: Sep. 24, 1996

[54] PROCESS AND APPARATUS FOR RECOVERY AND PURIFICATION OF ARGON FROM A CRYOGENIC AIR SEPARATION UNIT

[75] Inventors: Ravi Prasad, East Amherst; Dante P. Bonaquist, Grand Island, both of N.Y.

[73] Assignee: Praxair Technology, Inc., Danbury, Conn.

[21] Appl. No.: 409,242

[22] Filed: Mar. 24, 1995

[51] Int. Cl.[6] .................................................. F25J 3/04
[52] U.S. Cl. .............................................. 62/648; 62/924
[58] Field of Search ........................... 62/22, 18, 24, 62/648, 924

[56] References Cited

U.S. PATENT DOCUMENTS

| | | | |
|---|---|---|---|
| Re. 34,595 | 5/1994 | Chen et al. | 95/54 |
| 4,817,392 | 4/1989 | Agrawal et al. | 62/18 |
| 4,836,836 | 6/1989 | Bennett et al. | 62/22 |
| 4,861,361 | 8/1989 | Jain et al. | 62/18 |
| 4,871,382 | 10/1989 | Thorogood et al. | 62/18 |
| 4,983,194 | 1/1991 | Hopkins et al. | 62/22 |
| 4,994,098 | 2/1991 | Agrawal et al. | 62/22 |
| 5,019,144 | 5/1991 | Victor et al. | 62/22 |
| 5,019,145 | 5/1991 | Rohde et al. | 62/22 |
| 5,035,726 | 7/1991 | Chen et al. | 55/16 |
| 5,133,790 | 7/1992 | Bianchi et al. | 62/22 |
| 5,159,816 | 11/1992 | Kovak et al. | 62/22 |
| 5,197,296 | 3/1993 | Prosser et al. | 62/22 X |
| 5,426,946 | 6/1995 | Corduan et al. | 62/22 |
| 5,440,884 | 8/1995 | Bonaquist et al. | 62/22 |
| 5,447,555 | 9/1995 | Yee et al. | 95/54 |
| 5,454,923 | 10/1995 | Nachlas et al. | 204/270 |

FOREIGN PATENT DOCUMENTS 377117  7/1990  European Pat. Off. .
9506146  3/1995  WIPO .

Primary Examiner—Christopher Kilner
Attorney, Agent, or Firm—Stanley Ktorides

[57] ABSTRACT

This invention relates to a process and apparatus for producing high purity product grade argon from an argon-containing stream using a cryogenic argon column in combination with a solid electrolyte ionic or mixed conductor membrane.

16 Claims, 6 Drawing Sheets

PROCESS AND APPARATUS FOR RECOVERY AND PURIFICATION OF ARGON FROM A CRYOGENIC AIR SEPARATION UNIT

BACKGROUND OF THE INVENTION

1. Field of the Invention

This invention relates to a process and apparatus for manufacturing high purity product grade argon from an argon-containing stream using an argon column in combination with a solid electrolyte ionic/mixed conductor membrane.

2. Description of Prior Art

Conventionally, argon production by cryogenic air distillation is facilitated by an air separation unit employing a high pressure column and a low pressure column linked by a condenser/reboiler, with an argon side-arm stripping column (or "argon column") attached to the low pressure column. A fraction of vapor that rises through the low pressure column is diverted through a conduit therein to the base of the argon column. This vapor typically contains from about 5 to about 25% argon, and a small amount of nitrogen (typically, about 500 ppm), with oxygen and trace contaminants of the feed air stream constituting the balance thereof.

The function of the argon column is to further concentrate the argon content of the vapor—from the feed concentration of about 5 to about 25% to a level of about 98% or greater in the rising vapor. The argon column is refluxed by condensing most of the rising vapor using an argon condenser. Refrigeration for this condenser may be furnished from a number of sources including liquid from the base of the high pressure column, which itself is at least partially vaporized in the argon column condenser. The resulting liquid (or at least a major portion thereof) is introduced as reflux to the top of the argon column. As the reflux liquid descends within the argon column, the oxygen content of the reflux liquid increases. The descending reflux liquid is collected at the base of the argon column, and thereafter introduced to the low pressure column at or near the point where the argon column feed was originally withdrawn. An overhead product stream, either in vapor or liquid phase, is withdrawn from the argon column or the argon condenser, with the ratio of the argon column feed flow rate to product flow rate typically being about 25:1.

The relative volatility of argon to oxygen at the bottom of the argon column is about 1.5 and decreases to about 1.1 at the top of the column, where the product stream contains argon at a level of about 98% or greater. It is generally accepted that about 50 equilibrium stages in an argon column will produce argon containing less than about 2% oxygen, with an overall argon recovery of about 80% or greater based on the quantity of argon entering the air separation unit. Although some commercial argon applications can tolerate oxygen impurity levels as high as about 2%, most applications require the oxygen impurity level to be reduced to less than about 10 parts per million (ppm).

The elimination of oxygen to such an extent has heretofore necessitated further processing of the argon product withdrawn from the argon column. Such argon (sometimes referred to as "crude argon") has been further purified using catalytic deoxygenation, which first mixes an excess of hydrogen with the crude argon vapor and thereafter passes the mixture over a catalyst to form water. The water so formed is subsequently removed, such as by drying over an adsorbent.

While the quantity of oxygen removed by these conventional processes is relatively small, the cost and complexity of a catalytic deoxygenation process itself is significant. Such processes require heat exchangers, a catalytic reactor, an aftercooler, dual adsorbent dryer beds in cyclic operation and a cryogenic distillation column for excess hydrogen removal. In addition, a continuous supply of hydrogen is required, which makes these processes less attractive to geographic regions where hydrogen is either expensive or not readily available.

As an alternative to catalytic deoxygenation, oxygen impurities in crude argon may be reduced to acceptable levels by increasing the number of equilibrium stages within the argon column from about 50 to greater than 150. See, e.g., European Patent Publication EP 0 377 117. One common drawback with an argon column of 150 equilibrium stages or more is its physical height, which dominates the design and packaging of the air separation unit. Even with an argon column of 50 equilibrium stages, the combined height of the argon column and the argon condenser factors into determining the total height of the air separation unit when the liquid collected at the base of the argon column is to be returned to the upper column by gravity transfer. If a pump is used to return this liquid, an argon column of about 120 equilibrium stages can be used, provided the top of the argon condenser and the top of the low pressure column (when stacked above the high pressure column) are comparable in elevation. While this arrangement is advantageous for economically packaging the air separation unit, it is not capable of producing argon efficiently, particularly at the desired rate of recovery and level of purity. And further processing is then required to reduce oxygen impurities to an acceptable level.

Solid electrolyte membranes have been suggested to purify argon by removing oxygen therefrom. See, e.g., U.S. Pat. Nos. 5,035,726 and its reissue Re. 34,595 (Chen). However, application of such membranes to purify argon requires compressors to elevate the pressure of warmed argon vapor, the use of which increases processing costs associated with impurity removal.

Thus, the development of a simple, cost effective method for recovering purified argon from an argon-containing stream would be highly desirable.

Accordingly, it is an object of this invention to provide an improved system for purifying and recovering product grade argon from an argon-containing stream.

SUMMARY OF THE INVENTION

The present invention provides a process and an apparatus for producing high purity product grade argon from an argon-containing stream using a combination of an argon column and a solid electrolyte ionic or mixed conductor ("SELIC") membrane.

More specifically, the process of this invention involves the introduction of an argon-containing stream to a packed argon column having a reflux means and from about 78 to about 140 equilibrium stages. An argon-enriched fluid stream is withdrawn from the column, and the withdrawn argon-enriched fluid stream is then contacted with a SELIC membrane. Product grade argon having an oxygen concentration below about 10 ppm, preferably below about 5 ppm, most preferably below about 2 ppm, is then recovered from the membrane.

The apparatus of this invention provides a source of an argon-containing stream; an argon column to which an argon-containing stream is fed and from which an argon-enriched fluid stream is removed; a SELIC membrane; means for contacting the argon-enriched fluid stream with the SELIC membrane to remove oxygen from the stream; and means for recovering product grade argon with an oxygen concentration below about 10 ppm, preferably below about 5 ppm, most preferably below about 2 ppm, from the SELIC membrane. The argon column includes packing and a reflux means, and is capable of operating at about 78 to about 140 equilibrium stages.

BRIEF DESCRIPTION OF THE FIGURES

FIG. 1 depicts a schematic diagram of an argon column in combination with a SELIC separator unit for use in the present invention.

FIG. 2 depicts a schematic diagram of an argon column in combination with a SELIC a separator unit for use in the present invention, where a pump is placed between the argon column and the SELIC membrane.

FIG. 3 depicts a schematic diagram of an argon column in combination with a SELIC separator unit for use in the present invention. In this embodiment, a pump is placed between the argon column and the SELIC membrane, and a storage tank is placed between the argon column and the pump.

FIG. 4 depicts a schematic diagram of an argon column in combination with a SELIC separator unit for use in the present invention, where a portion of the purified argon is used as a sweep stream in connection with the SELIC membrane.

FIG. 5 depicts a schematic diagram of an argon column in combination with a SELIC separator unit for use in the present invention, where a column is placed after the SELIC membrane for nitrogen removal from argon.

FIG. 6 is a graph plotting the mole fraction oxygen content of argon recovered against the equilibrium stages of an argon column.

DETAILED DESCRIPTION OF THE INVENTION

Figure 1:
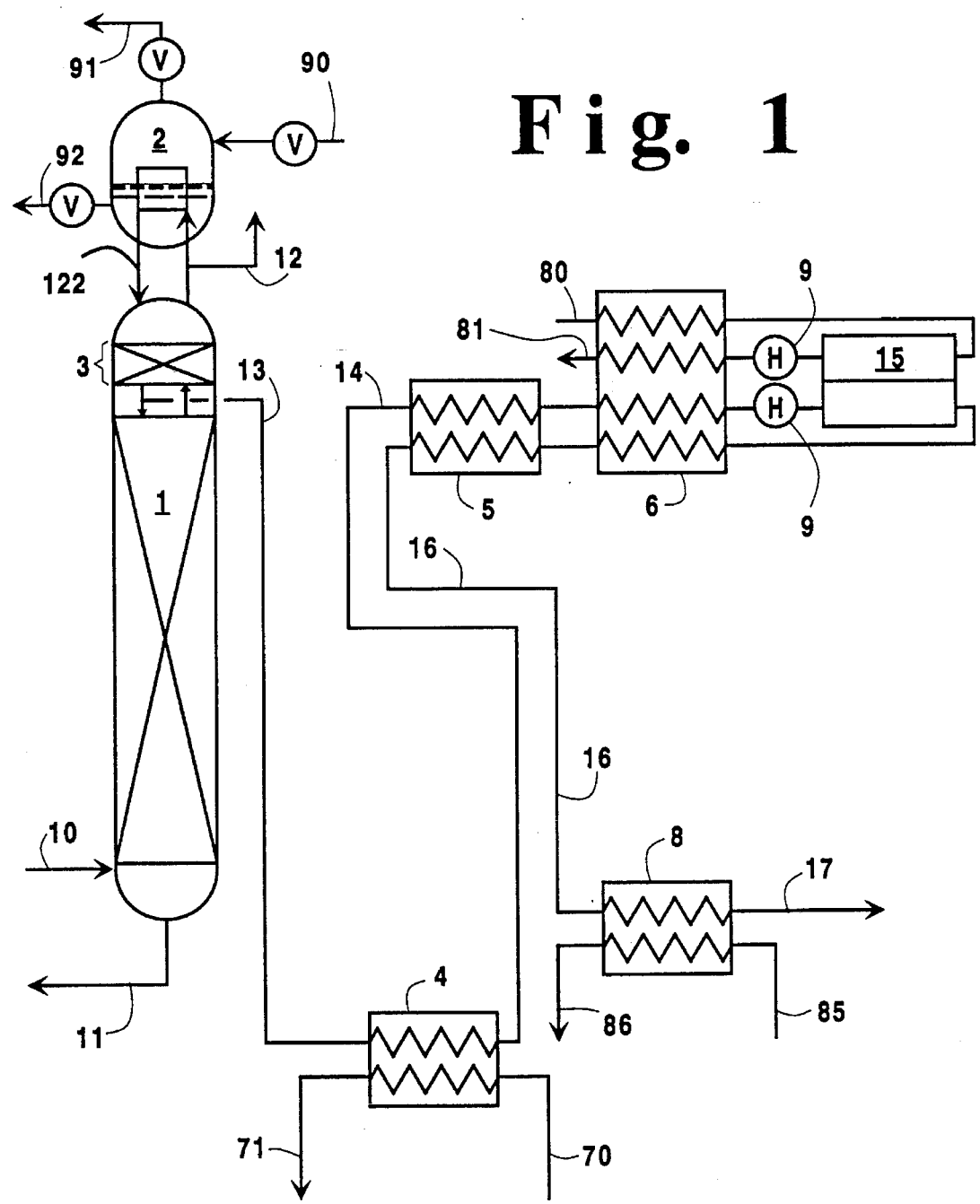
In FIGS. 1 through 6, like components and streams are referred to by like reference numerals.

The invention will now be described in detail, initially with reference to FIG. 1.

The feed to argon column 1 is obtained from a cryogenic air separation process, as described hereinafter. Clean, compressed feed air is cooled by passage through a heat exchanger, with the resulting cooled stream passed into a high pressure column. There, the feed air is separated using cryogenic methods into an oxygen-enriched liquid and a nitrogen-enriched vapor. The oxygen-enriched liquid is removed from the high pressure column, and then partially vaporized in the argon column top condenser. From the condenser, the part-liquid, part-vapor oxygen-enriched fluid is introduced into a low pressure column. Similarly, the nitrogen-enriched vapor is removed from the high pressure column, and condensed into a liquid. A portion of the nitrogen-enriched liquid is returned to the high pressure column, and the remaining portion is passed into the low pressure column.

Within the low pressure column, the nitrogen-enriched and oxygen-enriched feed streams are separated using cryogenic methods into refined nitrogen and oxygen, respectively. In addition, a vapor stream having an argon concentration within the range of from about 5 to about 25 percent is withdrawn from the low pressure column. With reference to FIG. 1, this vapor stream is introduced to the base of argon column 1 as feed stream 10. The nitrogen content of feed stream 10 may be reduced to negligible levels by practicing the invention of U.S. Pat. No. 5,133,790 (Bianchi et al.), the disclosure of which is hereby incorporated herein by reference.

Argon column 1 operates as a stripping column so that the argon content of the vapor increases (or the vapor becomes argon-enriched) as it rises through the column. Argon column 1 operates under cryogenic conditions. Argon column 1 is constructed with equilibrium stages within the range of above about 50 to about 150, preferably within the range of about 78 to about 140 and more preferably within the range of from about 110 to about 120. The term "column" as used herein is meant to refer to a distillation or fractionation column or zone (i.e., a contacting column or zone) wherein liquid and vapor phases are countercurrently contacted to effect separation of a fluid mixture, such as with a series of vertically spaced trays or plates mounted within the column and/or on packing elements. For a further discussion of distillation columns, see B. D. Smith et al., *Chemical Engineers' Handbook*, 13, 5th ed. R. H. Perry and C. H. Chilton, eds., McGraw-Hill Book Company, New York (1973). Cryogenic fractionation refers to fractionation carried out, at least in part at a temperature equal to or less than 150° K.

Reflux is provided in argon column 1 by condensing the vapor that rises therethrough in a reflux means, such as argon condenser 2, which is maintained under refrigeration. Liquid withdrawn from the air separation system (not shown) may be subcooled, and then introduced to argon condenser 2 as liquid stream 90. Liquid stream 90, which is partially vaporized on the boiling side of argon condenser 2, forms vapor stream 91 and liquid stream 92.

Argon column 1 may be fitted with a short top section 3 and purge line 12. Purge line 12 may be used to control the buildup of volatile contaminants, such as nitrogen, should they enter argon column 1. Liquid reflux from argon condenser 2 is introduced to the top of argon column 1 via line 122. As the liquid reflux descends through argon column 1, its oxygen content tends to increase. The oxygen-enriched liquid reflux collects at the base of argon column 1, and is returned to the air separation system by stream 11. The transfer of this liquid may be accomplished by the force of gravity or by pumping, depending upon the relative elevations of the base of argon column 1 and the point on the air separation system where feed stream 10 is withdrawn.

Through the use of trays or packing, the rising vapor and descending liquid come into countercurrent contact within argon column 1. As used herein, the term "packing" is meant to include any solid or hollow body of predetermined configuration, size, and shape used as column internals to provide surface area for the liquid to allow mass transfer at the liquid-vapor interface during countercurrent flow of the liquid and vapor phases. Preferably, structured packing is employed throughout argon column 1. As used herein, the term "structured packing" is meant to include packing where individual members have specific orientation relative to each other and to the column axis.

Stream 13, a liquid product stream enriched in argon, may be withdrawn from argon column 1 at an appropriate location near the top portion thereof. Stream 13 contains oxygen within the range of from about 0.001% and 0.1%, depending on the equilibrium stages within the column (e.g., about 78 to about 140).

Figure 3:
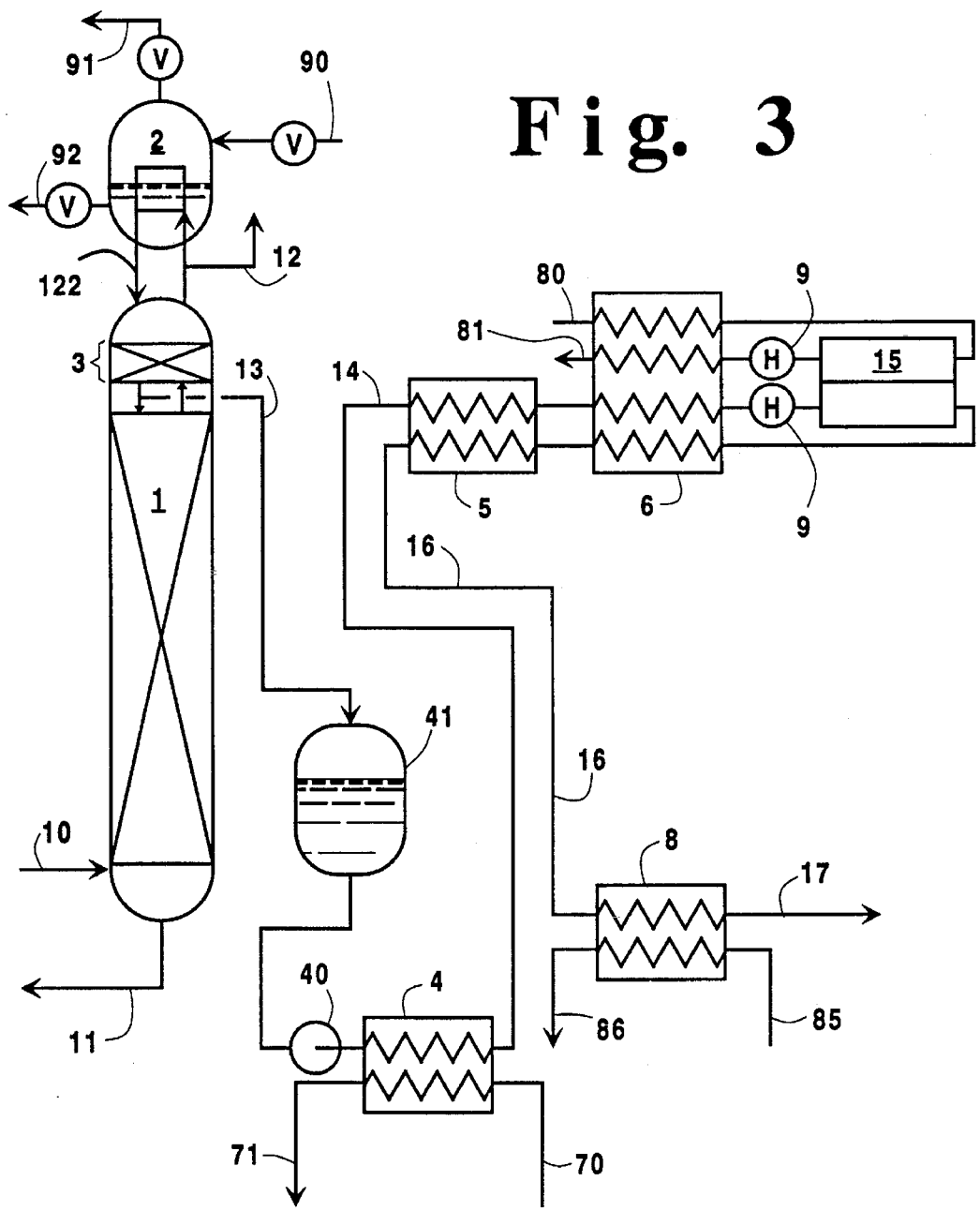

The pressure of stream 13 is increased by hydrostatic head due to the difference in elevation between the point of withdrawal from argon column 1 and vaporization in heat exchanger 4. In addition, the withdrawal of a liquid stream 13 from argon column 1 permits placement of a storage tank between argon column 1 and SELIC separator unit 15 such as is shown in FIG. 3. This allows for operation of the SELIC membrane in separator unit 15 independent from argon column 1, if so desired. The withdrawal of a liquid stream 13 from argon column 1 also permits subsequent processing steps to operate at elevated pressures without implementing a compression step, such as with an argon compressor. Such a measure minimizes capital expense and maintenance expense.

An appropriate refrigeration sink, such as a high pressure air stream that is condensed in heat exchanger 4, may be used to remove refrigeration from vaporized argon. Stream 70 may be high pressure air, nitrogen or any other gas capable of condensing or expelling a sufficient quantity of sensible heat at the temperature at which argon boils at a given pressure. Stream 71 may be high pressure air, such as liquefied air. In such case, stream 71 should be introduced at or near the base of the high pressure column of the air separation unit. The resulting argon vapor 14 may be warmed in heat exchanger 5 against purified argon vapor 16. Argon vapor 14 may be further warmed in heat exchanger 6 against purified argon vapor 16 and warm sweep gas 80. Argon vapor 14 may be still further warmed by heaters 9 to a temperature that is appropriate for introduction to an oxygen-transporting SELIC membrane, which is supported within the separator unit 15. Preferably the argon-enriched vapor is warmed to a temperature within the range of from 400° C. to 1200° C., most preferably within the range of from 500° C. to 900° C. Sweep gas 80, which may be nitrogen gas at low pressure containing a low concentration of oxygen (up to about 3 ppm), is further warmed in heaters 9 to a temperature that is appropriate for introduction to separator unit 15, which contains the SELIC membrane. Stream 81 is typically vented to the atmosphere; however, if the oxygen concentration of stream 81 is sufficiently low (e.g., less than about 500 ppm), stream 81 may be joined with the warm nitrogen product waste streams withdrawn from the air separation unit.

Separator unit 15 is comprised of two chambers that are separated by a SELIC membrane. Argon vapor 14 is introduced into one of the chambers of separator unit 15. As the argon vapor flows over the SELIC membrane, the oxygen contained in the crude argon vapor is selectively transported through the SELIC membrane. Hence, the oxygen concentration of the crude argon vapor is progressively reduced. In the case where the SELIC membrane is an ionic conductor, an externally applied electromotive force may be used to drive oxygen transport across the membrane. In the case where the SELIC membrane is a mixed conductor, the partial pressure of the oxygen on the downstream side of the membrane should be maintained below that of the upstream side of the membrane. This condition should be maintained across the entire surface area of the mixed conductor membrane. To maintain this oxygen partial pressure differential, any of several means may be employed, such as purging the downstream side of the mixed conductor membrane with an oxygen-depleted stream, vacuum pumping to reduce the pressure on the downstream side of the membrane, pressurizing the feed stream on the upstream side of the membrane, and the like.

The SELIC membranes employed in separator unit 15 are constructed of dense, ceramic oxides or mixtures of oxides, characterized by oxygen vacancies in their crystal lattice caused by defects or the introduction of dopants (such as, Y, Sr, Ba, Ca and the like). A vacancy diffusion mechanism is the means by which oxygen ions are transported through the crystal lattice. In general, elevated temperatures (above 400° C., preferably above 650° C.) is maintained during operation to achieve high mobilities of the vacancies. Preferably the temperature is within the range of from 400° C. to 1200° C., most preferably within the range of from 500° C. to 900° C. Large vacancy concentrations combined with high mobilities of the vacancies form the basis for rapid oxygen ion transport through the materials from which the SELIC membranes are constructed. Since only oxygen ions may occupy the crystal lattice vacancies, the ideal SELIC membranes possess infinite oxygen selectivity.

In the present invention, the SELIC separators employed in combination with the argon column have several advantages over currently available technology for argon purification and recovery: the SELIC separator is simple and compact, operates continuously, and is capable of achieving nearly complete deoxygenation of argon. Since catalytic deoxygenation is not involved, the need for a hydrogen supply is obviated and hydrogen contamination of product argon and additional downstream processing for its removal is also obviated. In addition, since the SELIC membranes transport only oxygen, recovery of high purity product grade argon may be high leading to favorable economics.

Different types of SELIC materials may be employed in separator unit 15 keeping with the spirit of the present invention. For instance, the SELIC membrane may be comprised of a material that is primarily an oxygen ion conductor [e.g., Y-stabilized Zr ("YSZ") which is $ZrO_2$—$Y_2O_3$, 8% $Y_2O_3$ by weight] sandwiched between two porous electrodes. In practice, oxygen molecules diffuse through one of the porous electrodes to the electrolyte surface, at which point dissociation into oxygen ions occurs. That first porous electrode provides electrons for the process. The oxygen ions diffuse through the electrolyte and reach the second porous electrode, where recombination occurs thereby forming oxygen molecules and releasing electrons in the process. The electrons are returned to the first porous electrode for oxygen ionization by an external circuit.

As an alternative, the SELIC membrane used in this invention may be comprised of a material that conducts oxygen ions and electrons. Such materials are often referred to as mixed conductors. For mixed conductor SELIC membranes, electrons are returned to the high oxygen partial pressure side of the SELIC membrane by electronic conduction through the SELIC membrane itself thereby obviating the need for an external circuit.

Upon exiting SELIC separator unit 15, the purified argon vapor may be cooled in heat exchangers 6 and 5 to form argon stream 16. Also, sweep gas 80 may be cooled in heat exchanger 6 to form stream 81. Sweep gas 80 lowers the partial pressure of oxygen on the downstream (anodic) side of the SELIC membrane, and facilitates oxygen transport therethrough. This translates into smaller surface area requirements and/or lower energy requirements for SELIC separator unit 15. Thereafter, argon stream 16 may be condensed in heat exchanger 8 to form liquid argon product stream 17. Stream 85 is a fluid, such as liquid nitrogen, that is capable of condensing argon within heat exchanger 8. Stream 86 may be cold nitrogen vapor. The refrigeration contained in this stream may be recovered by joining stream 86 with the waste or the product nitrogen streams withdrawn from the low pressure column of the air separation unit.

The pressure of vaporized argon stream 14 may be limited to the gain in pressure due to the hydrostatic head caused by the difference in elevation between withdrawal from argon column 1 and point of entry in heat exchanger 4. This pressure is generally less than about 70 pounds per square inch absolute (psia). It may be advantageous, however, to operate the system with the pressure being less than about 40 psia. By so doing, a portion of the high pressure air used as feed for the air separation system may be directed to and condensed in heat exchanger 4 to vaporize argon stream 13. When structured packing is used, air pressure is preferably maintained at about 85 psia.

SELIC membranes themselves are not to date believed to be commercially available. However, materials used to prepare SELIC membranes are commercially available. Commercial vendors of such materials include Seattle Specialty Chemicals, Woodinville, Wash.

The thickness of the SELIC membrane should be below about 5000 μm, with below about 500 μm being preferred and below about 50 μm being more preferred. The commercially available materials used to prepare SELIC membranes may be fabricated into either thick self-supporting films or thin films supported on a suitable porous substrate using conventional techniques, such as extrusion, slip casting, calendaring, dip coating, spin coating and the like.

SELIC membranes in the form of thin films (e.g., having a thickness within the range of from about 50 μm to about 1000 μm) may be advantageously supported on substrates. Such porous substrates may be constructed of the same material or of different materials than the SELIC membrane itself. If the film thickness is large (e.g., above about 1000 μm), the SELIC membrane may be self-supporting. The SELIC membrane may also be deployed as a flat film or as a tubular member, with the latter being preferred.

The mixed conductor-type SELIC membranes may be prepared from a variety of materials including those listed in Table 1(a) below. In Table 1(a), δ is the deviation from oxygen stoichiometry. In addition, the x and y values may vary depending on the material composition.

TABLE 1(a)

Mixed Conductor SELIC Materials
Possible Material Compositions

1. $(La_{1-x}Sr_x)(Co_{1-y}Fe_y)O_{3-\delta}$ wherein  x  is greater than or equal to 0 and less than or equal to 1,
   y  is greater than or equal to 0 and less than or equal to 1, and
   δ  is determined from stoichiometry.

2. $SrMnO_{3-\delta}$ wherein  δ  is determined from stoichiometry.

3. $SrMn_{1-x}Co_xO_{3-\delta}$ wherein  x  is greater than or equal to 0 and less than or equal to 1, and
   δ  is determined from stoichiometry.

4. $Sr_{1-x}Na_xMnO_{3-\delta}$ wherein  x  is greater than or equal to 0 and less than or equal to 1, and
   δ  is determined from stoichiometry.

5. $SrCeO_3$

6. $YBa_2Cu_3O_{7-\delta}$
   wherein  β  is determined from stoichiometry.

7. $La_{0.2}Ba_{0.8}Co_{0.8}Fe_{0.2}O_{2.6}$

8. $Pr_{0.2}Ba_{0.8}Co_{0.8}Fe_{0.2}O_{2.6}$

9. $A_{x1}A'_{x2}A''_{x3}B_{y1}B'_{y2}B''_{y3}O_{3-z}$ wherein  A, A', A''  may be selected from Groups I, TABLE 1(a)-continued Mixed Conductor SELIC Materials
Possible Material Compositions II, III and F block lanthanides and combinations thereof,
   B, B', B''  may be selected from D block transition metals, and
   x1, x2, x3, y1, y2 and y3 lie between 0 and 1, and z is determined from stoichiometry.

10. Co-La-Bi-O type

Cobalt oxide (15 to 75 mole %)
    Lanthanum oxide (13 to 45 mole %)
    Bismuth oxide (17 to 50 mole %)

11. Co-Sr-Ce-O type

Cobalt oxide (15 to 40 mole %)
    Strontium oxide (40 to 55 mole %)
    Cerium oxide (15 to 40 mole %)

12. Co-Sr-Bi-O type

Cobalt oxide (10 to 40 mole %)
    Strontium oxide (5 to 40 mole %)
    Bismuth oxide (35 to 70 mole %)

13. Co-La-Ce-O type

Cobalt type (10 to 40 mole %,)
    Lanthanum oxide (10 to 40 mole %)
    Cerium oxide (30 to 70 mole %)

14. Co-La-Sr-Bi-O type

Cobalt oxide (15 to 70 mole %)
    Lanthanum oxide (1 to 40 mole %)
    Strontium oxide (1 to 40 mole %)
    Bismuth oxide (25 to 50 mole %)

15. Co-La-Sr-Ce-O type

Cobalt oxide (10 to 40 mole %)
    Lanthanum oxide (1 to 35 mole %)
    Strontium oxide (1 to 35 mole %)
    Cerium oxide (30 to 70 mole %)

16. $Bi_{2-x-y}M'_xM_yO_{3-\delta}$ wherein  M'  may be selected from Er, Y, Tm, Yb, Tb, Lu, Nd, Sm, Dy, Zr, Hf, Th, Ta, Nb, Pb, Sn, In, Ca, Sr, La and combinations thereof,
    M  may be selected from Mn, Fe, Co, Ni, Cu and combinations thereof, x is greater than or equal to 0 and less than or equal to 1,
    y  is greater than or equal to 0 and less than or equal to 1, and
    δ  is determined from stoichiometry.

17. $BaCe_{1-x}Gd_xO_{3-x/2}$ wherein  x  is greater than or equal to 0 and less than or equal to 1.

A mixed conductor-type SELIC membrane can transport oxygen when subjected to a differential partial pressure of oxygen, without an applied electric field. Thus, as noted supra, no electrodes or an external circuit for electronic current return are needed for such mixed conductor-type SELIC membranes.

Mixed electronic/ionic conductors in general are dual phase mixed conductors that are comprised of physical mixtures of an ionically-conducting phase and an electronically-conducting phase. The electronic/ionic-type SELIC membrane may be prepared from a variety of such materials including those listed in Table 1(b) below:

TABLE 1(b)

Mixed Electronic/Ionic Conductor SELIC Materials
Possible Material Compositions

18. $(Pd)_{0.5}/(YSZ)_{0.5}$
19. $(Pt)_{0.5}/(YSZ)_{0.5}$
20. $(B\text{-}MgLaCrO_x)_{0.5}/(YSZ)_{0.5}$
21. $(In_{90}Pr_{10})_{0.4}/(YSZ)_{0.6}$
22. $(In_{90}Pr_{10})_{0.5}/(YSZ)_{0.5}$
23. $(In_{90}Pr_{2.5}Zr_{2.5})_{0.5}/(YSZ)_{0.5}$ The partial pressure of oxygen on the feed (crude argon) side of the entirety of the SELIC membrane should exceed the partial pressure of oxygen on the downstream side at the entirety of the SELIC membrane. This may be achieved by purgings the downstream side of the SELIC membrane using a sweep gas, such as nitrogen. The sweep gas should be in an amount sufficient to ensure that the oxygen concentration at all locations along the SELIC membrane is lower on the downstream side than on the upstream-feed side of the membrane. The choice of nitrogen causes a substantially complete recovery of argon and also eliminates the need to recycle sweep argon to a suitable point in the upstream process (e.g., into the argon column). If argon is used as the sweep gas, a recycle step is required to maintain acceptable recovery of purified argon.

The size of the chosen SELIC membrane, in terms of rate of oxygen transport per unit, is typically linked to the flux (i.e., the quantity of oxygen per unit area per unit time) of oxygen therethrough. High values of oxygen flux are desirable so that a smaller SELIC membrane area may be used to efficiently remove oxygen from the argon. The smaller SELIC membrane area reduces capital expense. The oxygen flux at any location on the SELIC membrane depends on many factors, including the ionic conductivity of the electrolyte, the thickness of the membrane and the gradient in oxygen chemical potential. High ionic conductivity [above about 0.01 S/cm (Siemans/cm), preferably above about 0.1 S/cm and more preferably above about 1.0 S/cm] should provide for optimized performance of the SELIC membrane. Maintaining the SELIC membrane at a sufficiently high temperature (above 400° C., preferably above 650° C.) also contributes to performance optimization in the process and apparatus of this invention, because the SELIC membrane possesses appreciable oxygen ion conductivity at elevated temperatures and the conductivity increases with increasing temperatures. The higher temperatures may also enhance the kinetics of surface exchange processes involving the SELIC membrane.

The gradient in chemical potential across the SELIC membrane is determined by the process conditions employed. This gradient may be increased by raising the crude argon feed pressure to the SELIC membrane, lowering the purge stream pressure, reducing the oxygen concentration in the purge stream and increasing the purge flow rate. The crude argon feed pressure should be less than about 70 psia, preferably less than about 40 psia. The average purge stream pressure should be within the range of about 15 to about 25 psia. The partial pressure of oxygen in the purge stream should be less than the oxygen partial pressure in the purified product grade argon. In general, the oxygen concentration of the purge stream should be below about 5 ppm, preferably below about 1 ppm.

A cleaning ratio is used to determine the purge flow rate, and is defined as follows:

$$\text{Cleaning Ratio} = \frac{\text{(Purge Flow)}}{\text{(Feed Flow)}} * \frac{\text{(Average Feed Pr.)}}{\text{(Average Purge Pr.)}}$$

This ratio should be within the range of from about 0.8 to about 5.0, preferably within the range of from about 1 to about 2. Cleaning ratios in excess of this range are undesirable because of economic factors availability of the purge stream in such amounts. Cleaning ratios in amounts below this range are also undesirable because SELIC membrane area requirements increase and the ability to achieve the desired purity levels may diminish.

Figure 2:
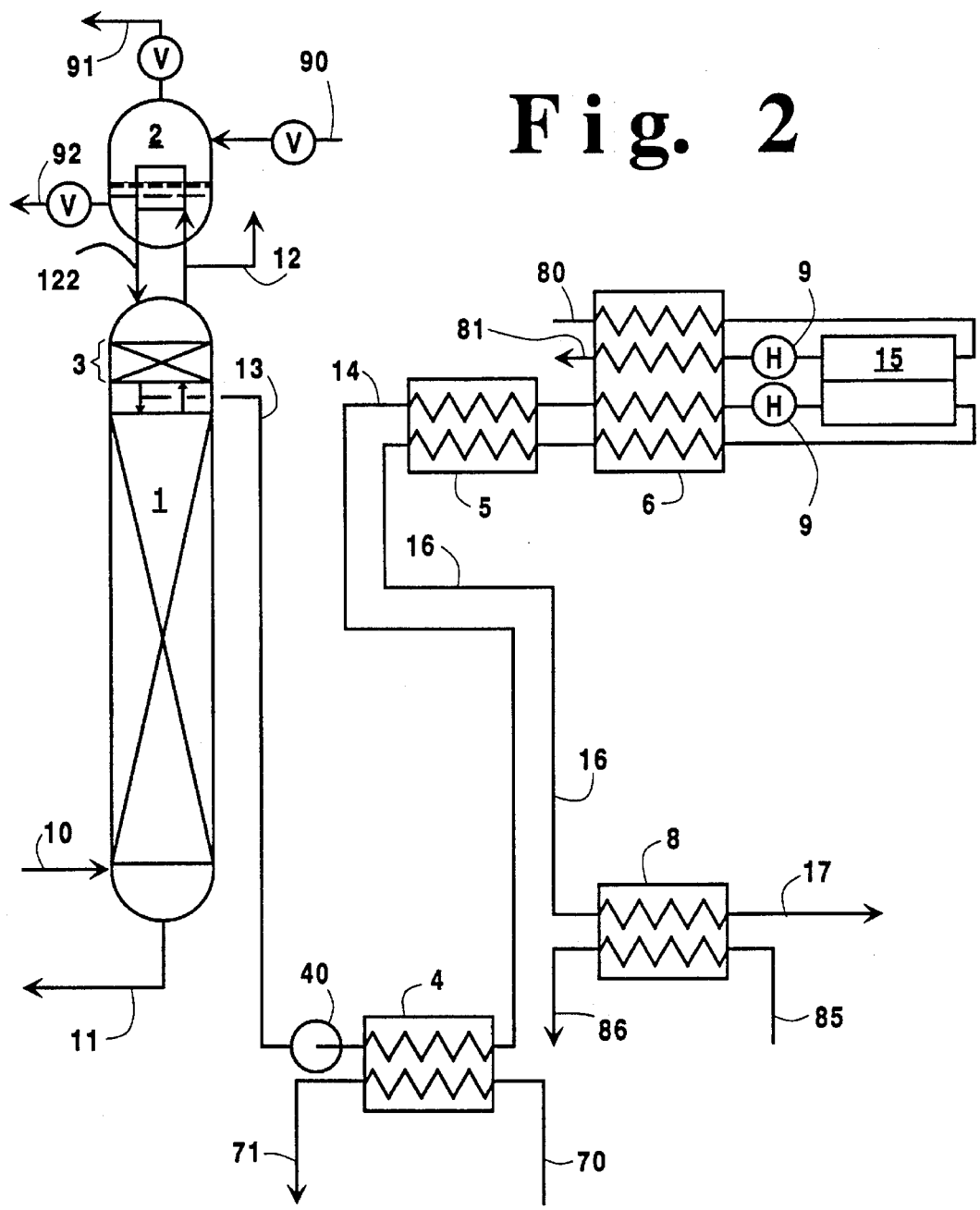

FIG. 2 shows an embodiment of this invention where pump 40 is inserted between the point where liquid stream 13 is withdrawn from argon column 1 and enters heat exchanger 4. This arrangement allows the pressure of the vaporized argon stream to be raised to any desirable level provided that a suitable condensing fluid is used for stream 70 in heat exchanger 4. In addition, rather than pump 40, an elevational difference between the draw of liquid stream 13 and heat exchanger 4 may be used to generate the pressure increase necessary.

FIG. 3 shows an embodiment of the invention where storage tank 41 is inserted between argon column 1 and heat exchanger 4. This arrangement allows the flow rate of stream 14 to be different than the flow rate of liquid stream 13 at any instant in time. The arrangement depicted in FIG. 3 may be advantageously employed for continuous operation of the air separator system and argon column 1. Similarly, the arrangement may be advantageously employed where storage tank 41 is used to provide a stream of crude argon to SELIC separator unit 15 at a later point in time—when, for example, argon column 1 is not in operation during processing through the SELIC membrane.

Figure 4:
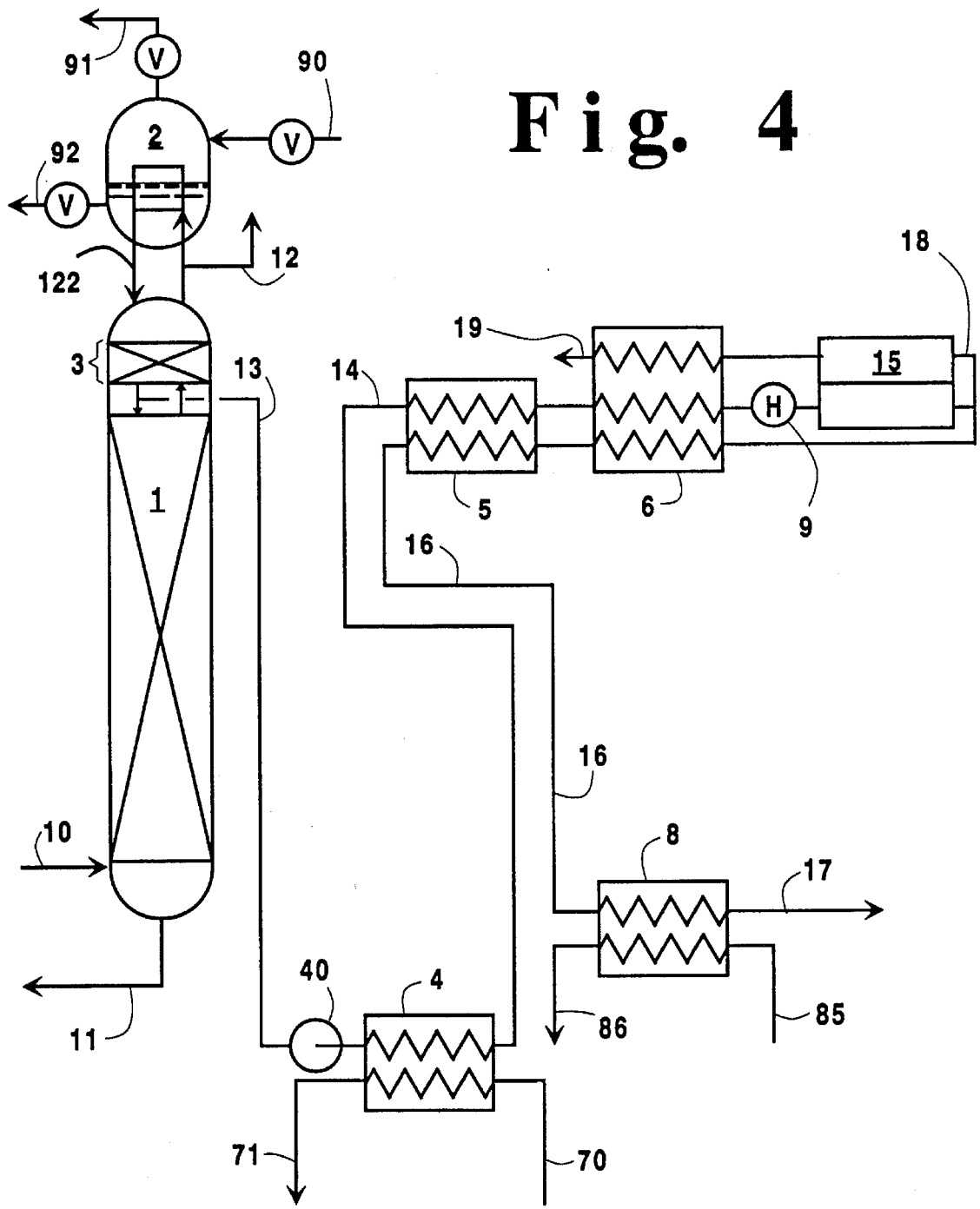

FIG. 4 shows the use of a portion of the purified argon as the sweep stream in SELIC separator unit 15. After processing through the SELIC membrane, the purified argon stream is divided into two fractions—majority and minority fractions. The majority portion is recovered as high purity product grade argon. The minority fraction, stream 18, is introduced as sweep gas to SELIC separator unit 15. Thereafter, sweep stream 18 is cooled in heat exchanger 6, and exits as cooled, sweep stream 19. It may be advantageous to recycle cooled, sweep stream 19 to an appropriate point in the air separation unit, such as with a main air compressor suction (not shown), to maintain the recovery of purified argon at acceptable levels, typically about 80% or more. Alternatively, sweep stream 19 may be further cooled in heat exchanger 5 and thereafter introduced to argon column 1 at an appropriate location, such as at the base or at an intermediate point of the column.

Figure 5:
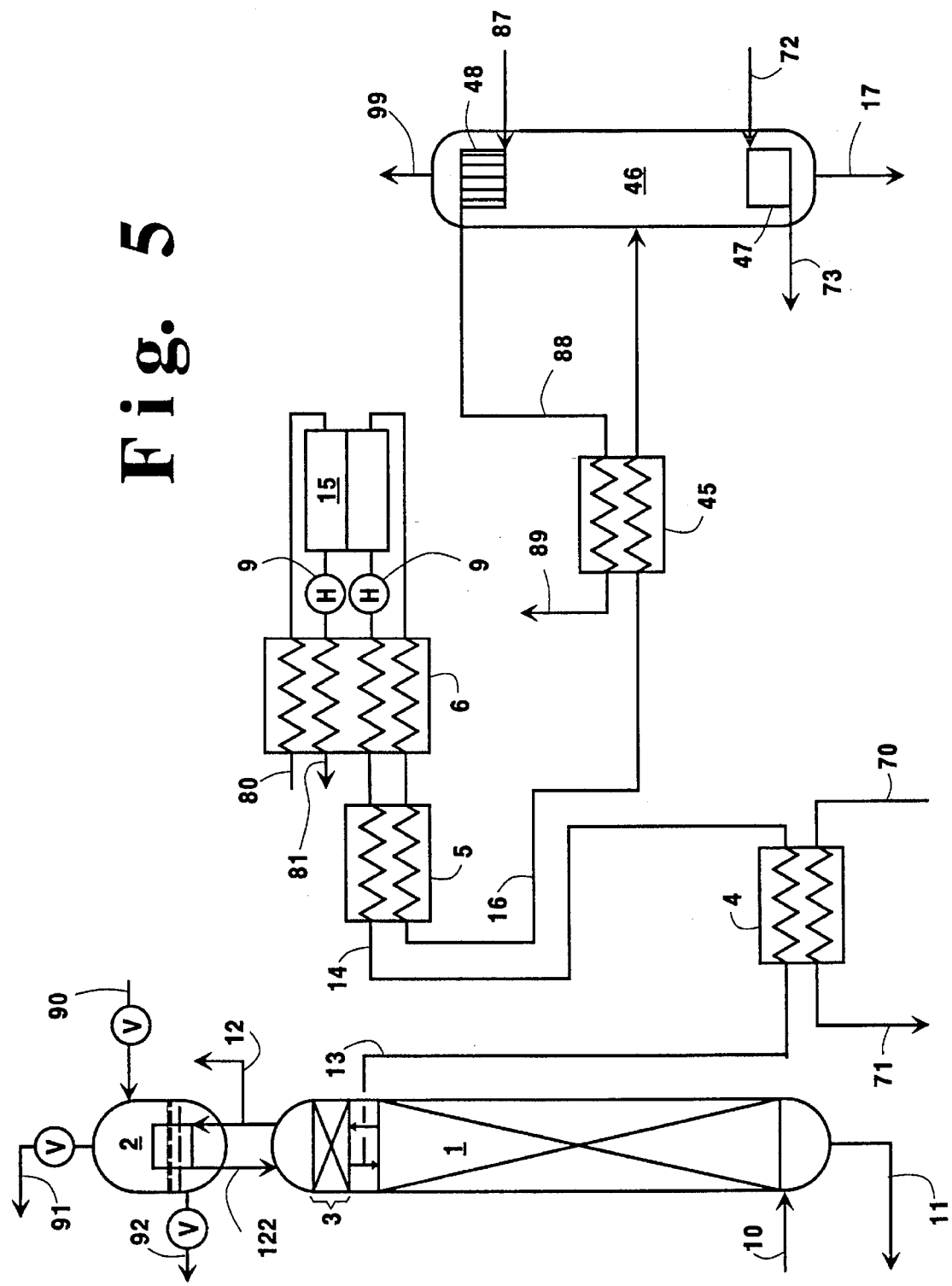

FIG. 5 shows an embodiment of the present invention similar to that shown in FIG. 1, except that feed stream 10 of argon column 1 contains a concentration of nitrogen of about 500 ppm. Following oxygen removal at the SELIC separator unit 15, purified argon vapor stream 16 is further cooled in heat exchanger 45 and introduced to nitrogen removal column 46. Purified argon liquid is withdrawn from the bottom of column 46 as stream 17. For column 46, condenser 48 should be refrigerated, and reboiler 47 should be heated. Liquid nitrogen at an appropriate pressure may be supplied to condenser 48 to provide refrigeration. The resulting vapor stream 88 may be warmed in heat exchanger 45 by cooling purified argon vapor stream 16. Stream 89 is typically returned to the air separation unit, where it may be joined with the nitrogen product stream.

To this point, the present invention has been described in the context of pressure-driven, mixed conductor SELIC membranes. Electrically-driven SELIC membranes based on ionic conductors may also be used in this invention. Table 2 below includes a non-exhaustive list of ionic conductors:

TABLE 2

Ionic Conductor SELIC Materials
Possible Material Compositions

24. $(Bi_2O_3)_x (M_{v1}O_{y2})_{1-x}$ wherein   M   may be selected from Sr, Ba, Y, Gd, Nb, Ta, Mo, W, Cd, Er and combinations thereof, and
             x   is greater than or equal to 0 and less than or equal to 1.

25. $CaTi_{0.7}Al_{0.3}O_{3-x}$ wherein   x   is greater than or equal to 0 and less than or equal to 1.

26. $CaTi_{0.5}Al_{0.5}O_{3-\delta}$
   wherein   $\delta$   is determined by stoichiometry.

27. $CaTi_{0.95}Mg_{0.05}O_{3-\delta}$
   wherein   $\delta$   is determined by stoichiometry.

28. $ZrO_{2-y}2O_3\text{-}Bi_2O_3$
29. $ZrO_{2-y}2O_3\text{-}B$
30. $BaCeO_3\text{: Gd}$
31. $BaCeO_3$; $BaCeO_3$:Y; $BaCeO_3$: Nd
32. $La_xSr_{1-x}Ga_yMg_{1-y}O_{3-\delta}$
   wherein   x   is greater than or equal to 0 and less than or equal to 1,
             y   is greater than or equal to 0 and less than or equal to 1, and
             $\delta$   determined by stoichiometry.

An electrically-driven SELIC membrane requires no external purge stream since the applied electromotive force may be used to drive oxygen against an adverse chemical potential gradient. In addition, by applying a relatively low electromotive force, the oxygen concentration in the product may be driven to extremely low levels—in the range of parts per million or even parts per billion. Applied voltage-driven oxygen transport allows for the present invention to operate with low feed pressures and/or high pressures of rejected oxygen. A small applied voltage can offset a large oxygen pressure ratio.

As with mixed conductor SELIC membranes, ionic conductor SELIC membranes operate at sufficiently elevated temperatures (e.g., above about 400° C., preferably about 650° C.) to achieve acceptable oxygen ion conductivities. The applied electromotive force depends on factors including the level of argon purification desired, the upstream and downstream pressures, the current density desired, the resistance of the electrolyte and the over-voltages (i.e., excessive voltage drops that occur at the electrodes due to non-idealities, such as interfacial resistance and electrode kinetics) at the electrodes. The voltage applied across the SELIC membrane should be within the range of from about 0.05 to about 5 volts, with about 0.25 to about 2.5 volts being preferred.

Typically, an insulated enclosure, such as a cold box, is used to house all the columns, condensers and heat exchangers associated with a cryogenic air separation process. Generally, the high pressure column, main condenser and low pressure column are stacked vertically and determine the physical height of the cold box. The crude argon column with its condenser is located along side of the low pressure column. For effective packaging of the components within the cold box, the height of the argon column components should not exceed the height of the low pressure column.

When structured packing is used in an argon column, the effective height equivalent to a theoretical plate ("HETP") is about 9.5 inches, including space for redistribution of liquid reflux, vapor redistribution, liquid and vapor feeds and draws. This compares to an effective HETP of about 14.8 inches in the low pressure column. Thus, a preferred ratio of argon column equilibrium stages to low pressure column stages is about 1.56 to maintain the same physical height on both columns. Since low pressure columns generally use between about 50 and about 90 equilibrium stages, preferably between about 70 and about 90 equilibrium stages, the number of argon column equilibrium stages, should be between about 78 and about 140, preferably between about 110 and about 140, when the elevation of the top of the argon condenser corresponds to that of the top of the low pressure column.

Figure 6:
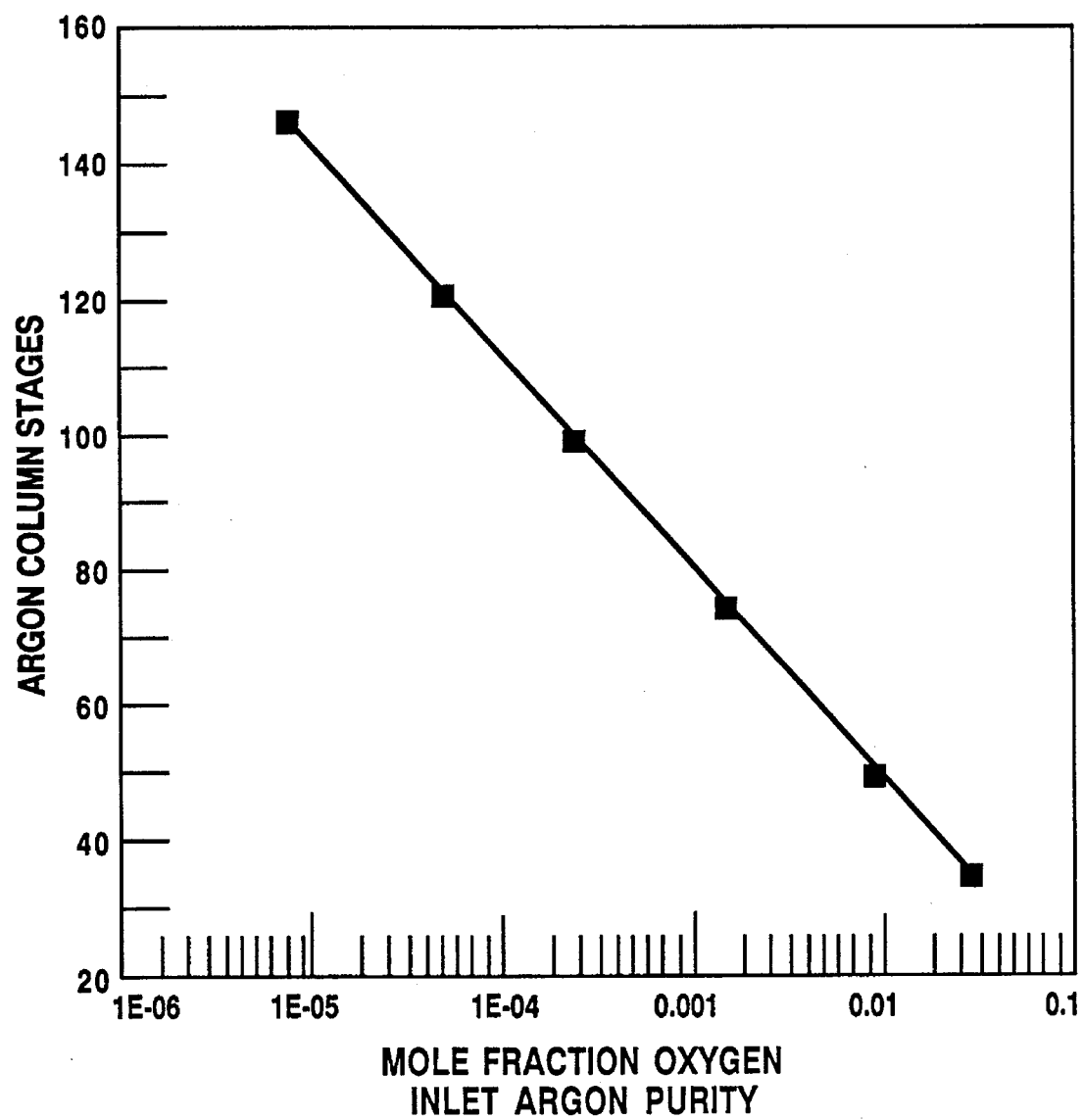

FIG. 6 shows the relationship of the inlet argon purity at the SELIC membrane (the outlet purity from the argon column) to the number of equilibrium stages in the argon column for an argon column operating at a feed pressure of about 20 psia. This range of equilibrium stages corresponds to an inlet purity at the SELIC membrane within range of about 0.001 to about 0.00001, preferably about 0.0001 to about 0.00001, mole fraction of oxygen impurity. following examples illustrate the benefits and utility of the present invention and are provided for purposes of illustration only.

EXAMPLES

Example 1

The following parameters were chosen for this example to illustrate the present invention:

| | |
|---|---|
| Flowrate of crude argon | 16,000 NCFH |
| Oxygen concentration of crude argon | 500 ppm |
| Nitrogen concentration of crude argon | 1 ppm |
| Pressure of crude argon at inlet to SELIC | 30 psia |
| Oxygen concentration purge nitrogen stream | 0.5 ppm |
| Argon concentration of purge nitrogen stream | 500 ppm |
| Average pressure of purge stream in SELIC | 16 psia |
| Purge stream flowrate | 8800 NCFH |
| Temperature of operation of SELIC | 800° C. |
| Ionic conductivity of SELIC material | 0.5 S/cm |
| Thickness of electrolyte | 1 mm |
| Area of electrolyte | 24 m$^2$ |
| Oxygen concentration in product argon | 1 ppm |
| Product argon flowrate | 15,990 NCFH |

NCFH refers to cubic feet/hour at normal temperature (about 70° F.) and pressure (about 14.7 psia). The material used for the SELIC membrane in this example is of the mixed conductor type, such as mixed conductor 1 from Table 1(a). The conditions of pressure and flowrates are typical of those associated with a system as depicted in FIG. 1. The conditions employed in Example 1 indicate that deoxygenation of the crude argon may be achieved using a modest purge flowrate and small SELIC membrane areas.

Example 2

The following parameters were chosen to illustrate the aspect of this invention where product grade argon is recycled through the system and used for purging at the SELIC membrane:

| | |
|---|---|
| Flowrate of crude argon | 16,000 NCFH |
| Oxygen concentration of crude argon | 500 ppm |
| Nitrogen concentration of crude argon | 1 ppm |
| Pressure of crude argon at SELIC inlet | 160 psia |
| Purge stream source | product Argon |

-continued

| | |
|---|---|
| Purge stream flowrate | 1920 NCFH |
| Purge exit oxygen concentration | 0.42% |
| Average pressure of purge stream in SELIC | 16 psia |
| Temperature of operation of SELIC | 800° C. |
| Ionic conductivity of SELIC membrane | 0.5 S/cm |
| Thickness of electrolyte | 1 mm |
| Area of electrolyte | 4.5 m² |
| Oxygen concentration in product argon | 1 ppm |
| Product argon flowrate | 14,080 NCFH |

The material used for the SELIC membrane employed in Example 2 is also of the mixed conductor type, such as mixed conductor 1 from Table 1(a). This SELIC membrane, as noted above, uses product argon for purging. The conditions of pressure and flowrates are typical of those associated with a system as depicted in FIG. 4. The results shown above indicate that deoxygenation of the crude argon may be achieved using small purge ratios and small SELIC membrane areas. These results also show that by compressing the crude argon to higher pressures, the purge and area requirements may be further reduced as compared to Example 1.

Although the invention has been described in detail with reference to certain preferred embodiments, those skilled in the art will recognize that there are other embodiments of the invention within the spirit and the scope of the claims.

What is claimed is:

1. A method for purifying and recovering product grade argon from an argon-containing stream, said method comprising the steps of:
    (a) introducing an argon-containing stream to a packed argon column having a reflux means and from 78 to 140 equilibrium stages;
    (b) withdrawing a purge stream from the argon column, withdrawing an argon-enriched liquid from the argon column below where the purge stream is withdrawn from the argon column, vaporizing the argon-enriched liquid to produce argon-enriched vapor and contacting the argon-enriched vapor with a solid electrolyte ionic or mixed conductor membrane; and
    (c) recovering product grade argon from step (b) having an oxygen concentration below about 10 ppm.

2. The method according to claim 1, wherein the argon-containing stream introduced to the argon column contains about 5 to about 25% argon.

3. The method according to claim 1, wherein the argon column has about 110 to 140 equilibrium stages.

4. The method according to claim 1, wherein the argon-enriched liquid contains argon in a concentration of at least about 98%.

5. The method according to claim 1, wherein the solid electrolyte ionic or mixed conductor membrane is a mixed conductor.

6. The method according to claim 1, wherein the solid electrolyte ionic or mixed conductor membrane is an ionic conductor.

7. The method according to claim 1, wherein the packing comprises structured packing.

8. The method according to claim 1 wherein the argon-enriched liquid is increased in pressure prior to vaporization.

9. The method according to claim 1 wherein the argon-enriched liquid is vaporized by heat exchange with air.

10. The method according to claim 1 wherein the argon-enriched vapor is warmed to a temperature within the range of from 400° C. to 1200° C. prior to the contacting with the solid electrolyte ionic or mixed conductor membrane.

11. An apparatus for purifying and recovering product grade argon from an argon-containing stream comprising:
    (a) a source of an argon-containing stream;
    (b) an argon column to which an argon-containing stream is fed comprising packing therein and a reflux means, said argon column capable of operating at about 78 to about 140 equilibrium stages and having means for withdrawing a purge stream from the argon column and, below said purge stream withdrawal means, means for withdrawing argon-enriched liquid from the argon column;
    (c) a solid electrolyte ionic or mixed conductor membrane;
    (d) means for vaporizing the argon-enriched liquid to produce argon-enriched vapor and means for contacting said argon-enriched vapor with said solid electrolyte ionic or mixed conductor membrane to remove oxygen from said stream; and
    (e) means for recovering product grade argon with an oxygen concentration below about 10 ppm from said solid electrolyte ionic or mixed conductor membrane.

12. The apparatus of claim 11 further comprising heat exchange means between the argon column and the solid electrolyte ionic or mixed conductor membrane.

13. The apparatus of claim 11 further comprising a pump between the argon column and the means for vaporizing the argon-enriched liquid.

14. The apparatus of claim 11 further comprising a liquid tank between the argon column and the solid electrolyte ionic or mixed conductor membrane.

15. The apparatus of claim 11 wherein the solid electrolyte ionic or mixed conductor membrane is a mixed conductor.

16. The apparatus of claim 11 wherein the solid electrolyte ionic or mixed conductor membrane is an ionic conductor.

* * * * *

UNITED STATES PATENT AND TRADEMARK OFFICE
CERTIFICATE OF CORRECTION

PATENT NO. : 5,557,951
DATED : September 24, 1996
INVENTOR(S) : R. Prasad et al.

It is certified that error appears in the above-identified patent and that said Letters Patent is hereby corrected as shown below:

In column 7, in Table 1(a) under item 4 insert -- $\delta$ -- between "and" and "is" so that the line reads "wherein X is greater than or equal to 0 and less than or equal to 1, and $\delta$ is determined from stoichiometry."

In column 7, in Table 1(a) under item 6 in the formula delete $\delta$ and insert therefor -- $\beta$ --.

In column 9, line 16 delete "purgings" and insert therefor --purging--.

Signed and Sealed this

Nineteenth Day of November, 1996

Attest:

BRUCE LEHMAN

*Attesting Officer*  *Commissioner of Patents and Trademarks*